March 20, 1934.　　　F. C. BOOTH　　　1,951,335
SPRING SHACKLE
Filed Dec. 22, 1926　　2 Sheets-Sheet 1
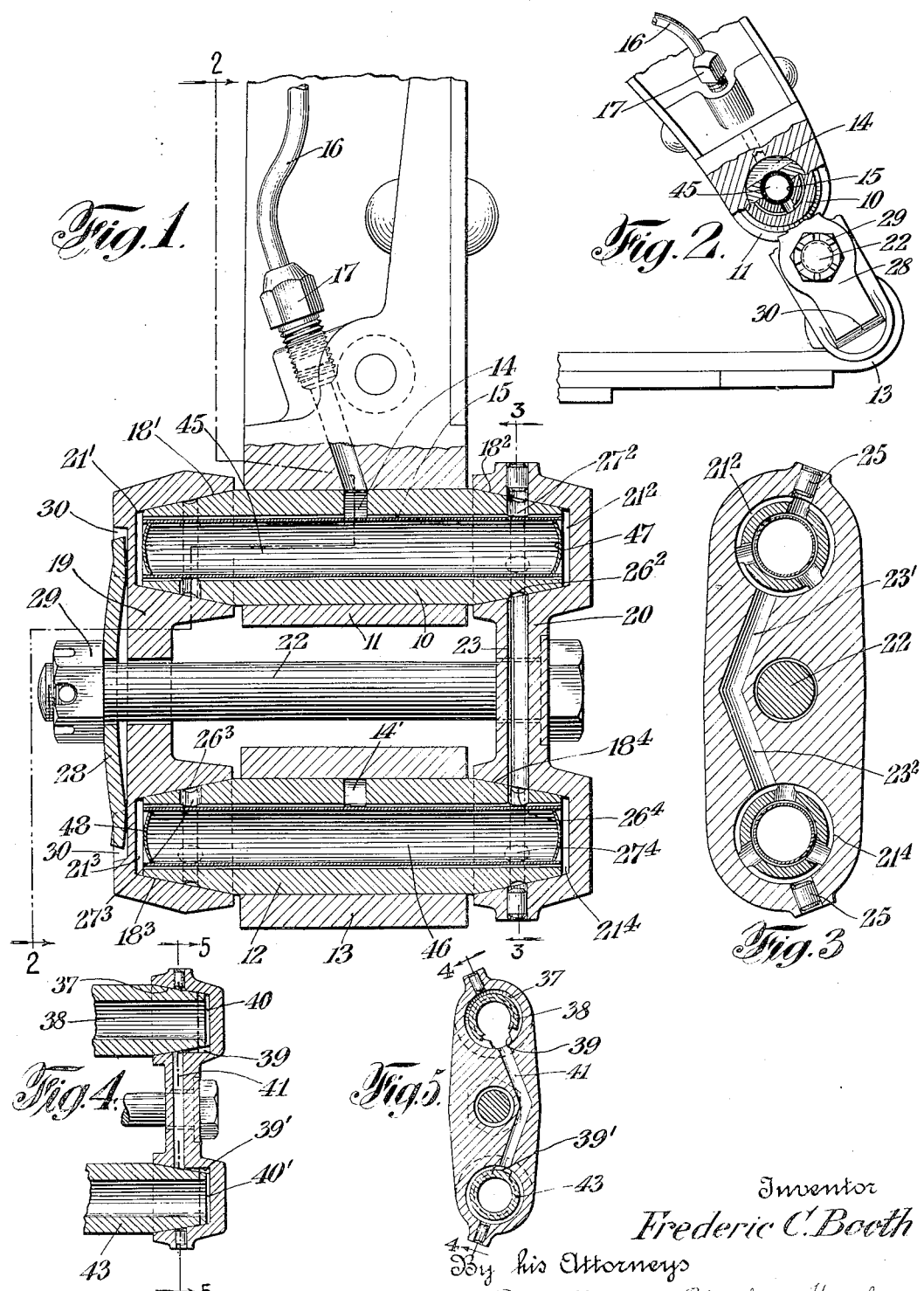
Inventor
Frederic C. Booth
By his Attorneys
Dean, Fairbank, Obrecht & Hirsch

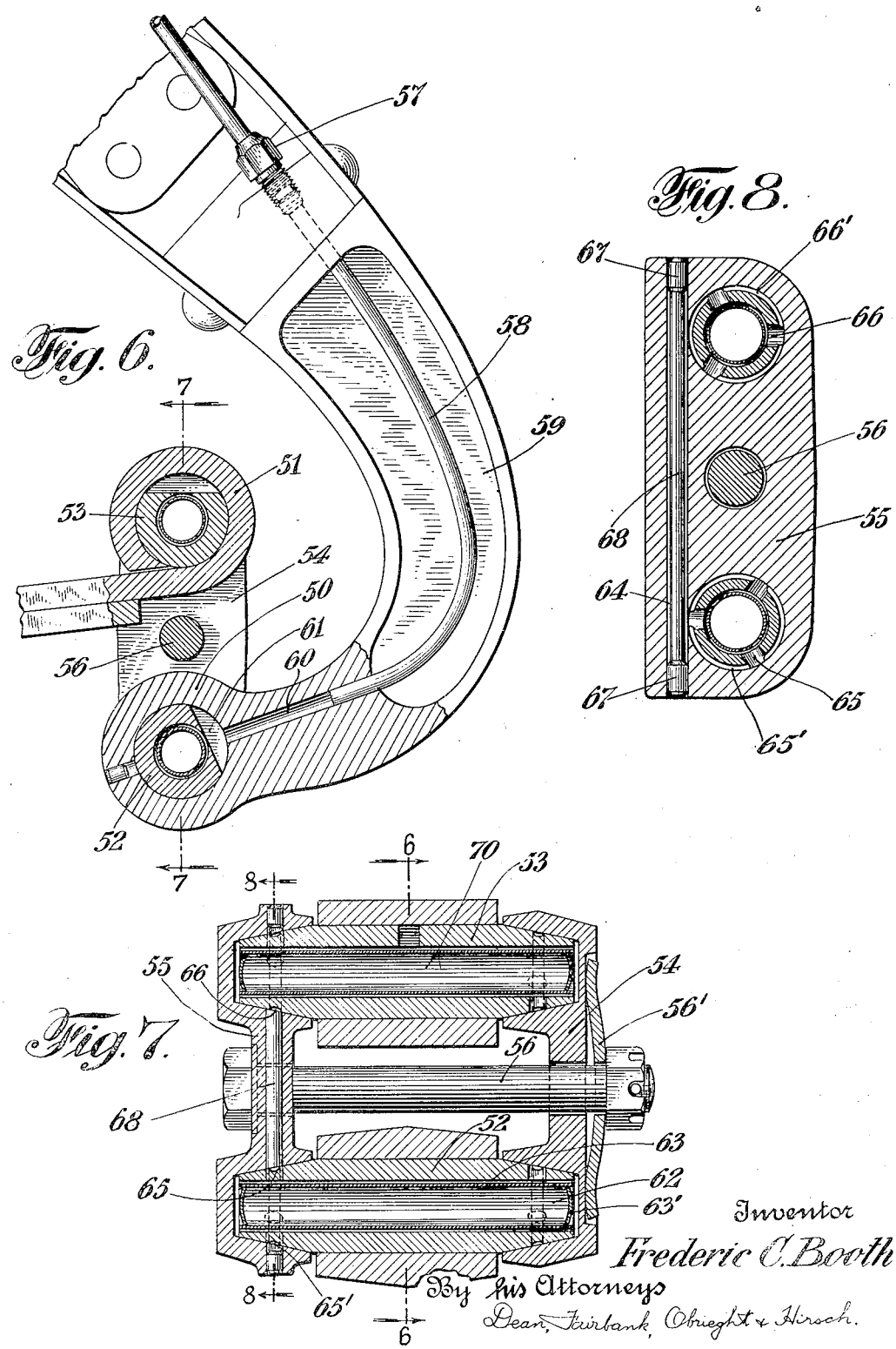

Patented Mar. 20, 1934

1,951,335

UNITED STATES PATENT OFFICE 1,951,335

SPRING SHACKLE

Frederic C. Booth, New York, N. Y., assignor to Auto Research Corporation, a corporation of Delaware Application December 22, 1926, Serial No. 156,295

22 Claims. (Cl. 267—54)

My present invention relates to spring shackles of the character employed on automobiles and motor trucks.

The invention is more especially concerned with shackles of the type, the wear in the bearing surfaces of which is automatically taken up by spring tension.

It is an object of the invention to provide a shackle of the above type, of relatively simple construction, the various bearing surfaces of which are reliably lubricated by automatic divisions of lubricant from a common source without the use of auxiliary ducts or flapping conduits, without providing boots, casings or other vulnerable protuberances, and without the need for overlubricating some part of the wear surface to assure sufficient lubrication elsewhere.

Another object is to provide a shackle of the above type which requires no gaskets for minimizing leak or for excluding foreign matter, but which on the contrary is constructed so that with parts exclusively of metal, leak of lubricant on the one hand, and entry of foreign matter on the other, are inherently avoided.

In the accompanying drawings in which are one or more of various possible embodiments of the several features of the invention Fig. 1 is a view in transverse section of one embodiment of the invention Fig. 2 is a sectional view on a smaller scale taken on line 2—2 of Fig. 1, Fig. 3 is a transverse sectional view taken on the line 3—3 of Fig. 1, Fig. 4 is a fragmentary view on a smaller scale and in transverse section, of another embodiment, taken along line 4—4 of Fig. 5, Fig. 5 is a sectional view taken on line 5—5 of Fig. 4, part of the upper pin broken away to better reveal the construction, Fig. 6 is a view similar to Fig. 2, and on a larger scale of an application to tension shackles, taken on line 6—6 of Fig. 7.

Fig. 7 is a sectional view taken on line 7—7 of Fig. 6, and;

Fig. 8 is an offset sectional view taken on line 8—8 of Fig. 7.

Referring now to Figs. 1, 2, and 3 of the drawings, I have shown a compression spring shackle comprising an upper pin 10 press-fitted into the corresponding eye 11 of the frame and a similar pin 12 similarly press-fitted into the eye 13 of the spring.

The pin 10 is provided with a transverse cut or kerf 14 for admission of lubricant to the bore 15 thereof from any suitable source such as an oil cup but preferably from a pipe 16 supplied concurrently with other parts on the automobile chassis from a single central source (not shown) of supply. The quota of oil to the shackle is determined by a flow control fitting shown only in exterior such as the drip plug 17.

The protruding ends of the two pins are tapered as at $18'$, $18^2$, $18^3$, $18^4$. A pair of shackle links 19 and 20 connect the two protruding ends of the pins and thereby sustain the vehicle frame upon the spring ends. Each of the shackle links is provided with a cup-shaped socket at each end thereof designated by numerals $21'$, $21^2$, $21^3$, and $21^4$. The sockets have a swivel bearing over the corresponding pin ends. The two shackle links are connected together by a bolt 22 the specific construction of which will be described below.

To lubricate the bearings of the spring pin 12 with oil derived by way of the frame pin 10 from the central source, I provide a bore 23 longitudinally of one of the links which communicates between the swivel sockets at the ends of said link. In order to clear the connecting bolt 22 which preferably extends midway between the two sockets and symmetrically of the width of the link, the bore 23 is preferably formed of two segments $23'$ and $23^2$ bored obliquely from opposite ends of the link and intersecting (see Fig. 3) laterally of the bolt. The outer ends of the bore segments beyond the sockets $21^2$ and $21^4$ are plugged as at 25.

In order to effect comunication from the bore 15 of the pin 10 to the bore 23 in the shackle link, without depriving the bearings of the upper pin of lubricant required therefor, the tapered end $18^2$ of the upper link is provided with a peripheral groove $26^2$ and with several preferably equidistant ports $27^2$ at the groove, communicating with the axial bore 15. Preferably each end of the two hollow pins is formed as described, the purpose of which construction will be more apparent from the description of the operation. The reference numerals at each bearing have corresponding exponents.

The construction is rendered leak-tight and at the same time rattle-proof by providing the bolt with a spring 28 preferably a leaf spring through the middle of which the end of the bolt extends, the nut 29 of the bolt stressing said spring. The ends of the spring preferably extend into corresponding notches 30 formed in the ends of the shackle link 19. By this construction the shackle links 19 and 20 are drawn inward for snug engagement of the sockets thereof upon the pin ends.

In use, lubricant is admitted through the drip plug 17 and through kerf 14 to the bore 15 of the upper pin. The lubricant spreads in both directions along bore 15, from which it will readily flow through one or more of the ports 27, thence along the length of the contiguous groove 26, spreading laterally by capillarity to lubricate the bearing or wear surface of the swivels 18' and 18². The bore 23 of the link 20 drains excess lubricant from groove 26² and feeds it downward to the corresponding grooves 26⁴ in the lower bearing pin. From this groove lubricant will spread laterally by capillarity to oil the bearing or wear surface thereof, while some of the lubricant will flow inward through one of the ports 27⁴ into the bore of the lower pin, overflowing at the opposite end through one or more of the ports 27³ therein to the peripheral groove 26³ and thence laterally to lubricate the fourth bearing of the shackle.

It will be seen that the spring 28 serves to maintain a uniform tension urging the socket cups of the shackle links into tight engagement with the corresponding tapered bearing pin ends and thereby affording a substantially uniform bearing engagement between the bearing pins and the links. This uniformity of bearing surface is maintained not only when the shackle is new, but after protracted wear.

As indicated in the drawings the bearing pins 10 and 12 for the frame and for the spring eye are preferably of identical construction so that any of the pins can be interchangeably used at either place. The kerf 14' accordingly appears in the spring eye pin although it performs no operative function there.

Metal filler cylinders 45 and 46 are preferably provided in the bores 15 and 30 respectively of the pins and extend with small clearance, the entire length thereof. For lightness these cylinders are preferably hollow and of aluminum and are plugged at their ends at at 47 and 48 respectively. The filler cylinders reduce to a minimum the effective oil containing volume of the pin bores, affording but a small cylindrical crevice maintained filled with oil by capillarity. The oil will thereby be distributed more readily to the upper as well as the lower part of the various swivel bearings than if these fillers were omitted.

In Figs. 4 and 5 is shown an alternative embodiment of compression shackle, in which the tapered pin ends 37 are shown devoid of grooves or apertures, the oil being conveyed from the bore 38 of the frame pin by way of a notch 39 in the lower part of the corresponding socket or cup 40 communicating with a longitudinal bore 41 through the link similar to that of Fig. 3. Bore 41 in turn communicates at its lower end with a notch 39' at the socket cup 40' in the spring end of the link. The filler cylinders in the bores of the pins though not shown are preferably provided as in the embodiment of Figs. 1, 2, and 3.

The lubricant spreads from each of the notches 39 and 39' by capillarity to lubricate the corresponding swivel bearing. The lubricant passing to the left along the bores of pins 38 and 43 passes about the corresponding ends thereof (not shown) into notches corresponding to those at 39 and 39' and thence spreads by capillarity to the swivel bearings at the left.

In Figs. 6, 7, and 8 is shown an application of the invention to a tension shackle, in which the frame eye 50 is at level lower than the spring eye 51. Hollow pins 52 and 53 identical with the corresponding pins of Fig. 1 are fixed in the respective eyes. Shackle links 54 and 55 which may also be identical with those of Fig. 1 are swivelled with respect to the taper ends of said pins and afford bearings thereat. The connecting bolt 56 between the links, serves to draw said link in position upon the tapering pin ends. A leaf spring 80 performs the same function as the corresponding spring 28 in Fig. 1.

The lubricant inlet fitting or drip plug 57 is applied in this embodiment at the channel frame end of the frame horn and the lubricant therefrom is conveyed through a seamless metal pipe 58 lodged within the channel 59 of said frame horn, to a bore 60 in the end of the frame horn which bore in turn delivers to the bore of pin 52 through a transverse kerf 61 in the pin registering with the end of bore 60 as shown in Fig. 6.

The lubricant then passes lengthwise of the pin bore and delivers through radial ports 65 in the taper ends of the pin 52, which ports communicate with peripheral grooves 65' about said taper ends. The lubricant spreads from grooves 65' to the taper bearing surface.

As in the copending application of Joseph Bijur, Serial No. 96,919 filed March 24, 1926, Patent No. 1,618,122, I facilitate the ascent of lubricant from the frame to the spring eye by reducing the volume of the connecting passageway therebetween to a minimum. As in the embodiment of Fig. 1, a hollow metal cylinder 62 is provided, plugged at 63' at its outer ends and extending with small clearance the entire length of the bore. The link bore which may be otherwise similar to that of Fig. 3, through which the lubricant is conveyed upward to the higher bearing is likewise provided with a filler.

In Fig. 8 I have illustratively shown a construction of oil feeding link alternative to that of Fig. 3 in which a single straight longitudinal bore 64 is disposed to one side of the axis of the link 55 so as to clear the connecting bolt 56. The bore extends preferably as shown substantially tangentially of the peripheral grooves 65' and 66' in the tapered bearing pins. A pin 68 fits loosely in the bore 64, the entire length of which it extends, plugs 67 in the ends of the bore preventing escape of the filler pin.

It will be apparent that after the first few operations the small space between the wall of the lower pin bore and the filling shell 62 therein has a film of oil retained therein by capillary attraction. Similarly there is a film within the link bore 64 about the filling pin 68. Accordingly when a charge of oil is then admitted through the drip plug 57 it passes through the pipe 58 into the bore 60 thence to kerf 61 and thence along the small space between bore and filler shell 62 to the taper bearings at the ends of the pin 52. These taper bearings being quite tight, lubricant will not escape therefrom, so that such charge through the drip plug as is not used at the lower bearings will displace oil about pin 68 in the link bore 64 upward to deliver through one or more of the ports 66 to the bore of the upper pin 53 from which the oil spreads to the bearing surfaces at the ends thereof in manner apparent from the previous description. The upper or spring bolt 53 preferably also has a filler cylinder or shell 70 similar to cylinder 62 to facilitate spread of lubricant to the upper and lower parts of the swivel bearings at the ends thereof.

I claim:

1. A spring shackle comprising a pair of pins fitted respectively in the frame and spring eye, shackle links bearing upon the ends of said pins, each having a taper swivel connection with the corresponding pin end, a cross-connection member including a stressed spring drawing said links together to effect a wear-compensating lubricant-tight connection at said swivels, one of said shackle links having a passageway clearing said cross-connection member and communicating at its opposite ends with the respective swivels thereat and means for admitting lubricant to the swivels at the frame, each of the swivels at the spring eye having means for passing lubricant from the link passageway to the wear surfaces of said swivels.

2. A spring shackle of the type in which the respective frame and spring eyes are provided with hollow pins rigid therewith and protruding therefrom, and in which the connecting shackle links have taper sockets swivelled over said pin ends and are drawn together by a bolt transversely therethrough; the combination therewith of means for feeding lubricant from a central source to all four of said swivel connections, said means comprising a duct along one of said shackle links, one or more ports through the pins for effecting communication from the respective bores thereof with the shackle link duct, and means transversely of said links and drawing the same together, holding the swivel supports against rattle and rendering lubricant-tight the oil communicating passage thereacross.

3. A spring shackle of the type in which the shackle links have tapered socket cup ends fitted over the corresponding protruding tapered ends of hollow pins fixed respectively in the frame and the spring eye; the combination therewith of a bore through one of said links communicating with the respective swivels at the ends thereof, a groove about each of said protruding pin ends communicating with said bore, oil ports through said pin ends communicating with said groove and a bolt connecting said links and having a spring associated therewith, tensioned by said bolt to draw the cupped ends at the extremities of said shackle link to take up rattle in said swivel connections and to render the same oil-tight.

4. A spring shackle comprising a pair of hollow pins, one fixed in the frame eye, the other in the spring eye, each having protruding tapered ends, a pair of shackle links having swivel bearings over said protruding tapered ends, a bolt through said two links between the ends thereof, a leaf spring about one end of the bolt and tensioned thereby to exert pressure against the ends of the sockets of the corresponding link to draw said links together, one of said links having a longitudinal bore therethrough connecting the respective sockets thereof, each of the corresponding pin ends having a groove in communication with the central bore of the pin and affording a relatively free path for flow of lubricant from one of the pins into the bore of the shackle link and from the latter into the bore of the other pin.

5. A spring shackle comprising a pair of identical hollow pins for application into the frame and spring eye, each of said pins having a tapered end and having a plurality of radial bores therethrough leading to a peripheral groove about the pin end, shackle links having cup-shaped sockets affording swivel connections over the respective pin ends, one of said links having a bore therethrough communicating at its opposite ends with peripheral grooves of the corresponding pin ends, a bolt extending transversely through said shackle links, one end of said bolt having a spring tensioned thereby, and reacting against the corresponding link sockets to draw the swivels tight against rattle and against leak of lubricant thereat, the pin in the frame member having an aperture in the wall thereof through which lubricant is admitted from a fixed source on the frame.

6. A spring shackle comprising a pair of hollow pins fixed respectively in the eye of the frame and that of the spring, each having its protruding ends tapered, the tapered ends of each of said pins having a peripheral groove and a plurality of radial bores communicating therewith, shackle links each provided with a tapered cup having a swivel fit over the pin, one of said links having a bore therethrough communicating with the respective grooves of the pin ends, a bolt transversely through the shackle links and drawing the same together, and a leaf spring at one end of said bolt tensioned thereby and exerting pressure near its ends upon the ends of the link sockets to effect a rattle-tight and lubricant-tight connection between the respective pin ends and the sockets therefor.

7. In a spring shackle of the type comprising hollow pins fixed in the respective frame and spring eyes and having tapered ends over which corresponding tapered sockets in the ends of shackle links have a swivel fit, and in which a bolt centrally through the two shackle links draws the same together; the combination therewith of a lubricant inlet through the wall of the pin in the frame eye, a bore through one of the shackle links extending laterally of the connecting bolt at the region at which the latter penetrates said link, each of said pin ends affording a communicating passageway between the bore of the pin and the swivel bearing surface, said bolt having a spring at one end thereof exerting tension to maintain the two shackle links spring-urged toward each other upon the respective pin ends, thereby avoiding rattle and effecting a lubricant-tight communication to and from the bore of the shackle link.

8. A spring shackle comprising a pair of hollow pins extending respectively through the frame eye and the spring eye and having tapered ends protruding therefrom, a pair of shackle links having tapered socket ends, affording swivel connections over the tapered pin ends, one of said links having a lubricant conveying bore longitudinally therethrough and communicating with the corresponding socket thereof, a bolt extending transversely through said links, a leaf spring tensioned by said bolt and reacting at its ends against the sockets of the non-bored shackle link, an inlet passage through the frame pin, and grooves effecting lubricant communication between the bores of the respective pins, the bore in the shackle link, and the various swivel bearing surfaces.

9. A spring shackle comprising a pair of hollow pins tightly fitted respectively in the frame eye and the spring eye and having tapered ends protruding therefrom, shackle links provided with tapered sockets fitting over the respective pin ends and affording swivel bearings thereat, a bolt transversely through said two links to draw the same together, peripheral grooves above the tapered ends, apertures through said pin ends and a bore through one of said links communicating with the respective grooves, said bore comprising two segments inclined with respect to the length of the link to clear the bolt.

10. A spring shackle comprising a pair of hollow pins tightly fitted respectively in the frame eye and the spring eye and having tapered ends protruding therefrom, shackle links provided with tapered sockets fitting over the respective pin ends and affording swivel bearings thereat, a bolt transversely through said two links to draw the same together, peripheral grooves above the tapered ends, apertures through said pin ends and a bore through one of said links communicating with the respective grooves, said bore comprising two segments inclined with respect to the length of the link to clear the bolt, and a leaf spring tensioned by said bolt and reacting against the ends of one of the links effect a lubricant-tight wear compensating swivelling connection at the four swivels.

11. A spring shackle comprising a pair of hollow bearing pins fixed respectively in a frame eye and in a spring eye, links having taper bearing fit with respect to the ends of said pins and connecting the same, means tightening said taper bearings, means admitting lubricant to the bore of the pin in the frame eye, a passageway from said pin along one of said links to the pin in the spring eye, and cores substantially filling the bore of one of the pins to reduce the effective volume thereof and form capillary passages therethrough.

12. A spring shackle comprising a pair of hollow bearing pins fixed respectively in a frame eye and in a spring eye, links having taper bearing fit with respect to the ends of said pins and connecting the same, means tightening said taper bearings, means admitting lubricant to the bore of the pin in the frame eye, a passageway from said pin along one of said links to the pin in the spring eye, and cores substantially filling the entire length and diameter of the bores of both of said pins to afford an annular capillary passage for lubricant along said bores.

13. In combination with a spring shackle co-operating with a frame eye and a spring eye and including a hollow pin with tapered ends fixed in the frame eye and protruding at said ends therebeyond, a hollow pin with tapered ends fixed in the spring eye and protruding at said ends therebeyond, a pair of shackle links each provided with tapered sockets fitting over the correspondingly tapered ends of the pins and affording a swivelling connection thereat and a bolt through the middles of said links drawing the tapered sockets thereof tight upon the corresponding taper pin ends; a lubricating installation comprising a lubricant inlet at the frame, a transverse slot between the ends of the frame pin receiving lubricant therefrom, a bore in said pin receiving lubricant from said slot, peripheral grooves in both pin ends, a plurality of apertures in both pins between the grooves and the bores and a longitudinal bore in one of said links substantially tangential to the sides of the pins and communicating with said grooves and thereby clearing said bolt, said longitudinal bore passing through said link from end to end thereof and being plugged at said ends between the ends of the link and the adjacent sides of the bolt.

14. In combination with a spring shackle co-operating with a spring eye and a frame eye and including a hollow pin with tapered ends fixed in the frame eye and protruding at said ends therebeyond, a hollow pin with tapered ends fixed in the spring eye and protruding at said ends therebeyond, a pair of shackle links each provided with tapered sockets fitting over the correspondingly tapered ends of the pins and affording a swivelling connection thereat and a bolt through the middles of said links drawing the same together tight upon the corresponding pin ends; a lubricating installation comprising a lubricant inlet at the frame, a bore in said frame pin, a port between the ends of the frame pin from the inlet to the bore, peripheral grooves in both tapered pin ends, a plurality of apertures between the bores and the grooves, a longitudinal bore in one of said links, substantially tangential to the grooves at the sides of the pins and thereby clearing the connecting bolt, and means to maintain said swivels in lubricant tight condition and prevent substantial leak therefrom, said longitudinal bore passing through said link from end to end thereof and being plugged at said ends between the ends of the link and the adjacent sides of the bolt.

15. In combination with a spring shackle co-operating with a spring eye and a frame eye and including a pair of hollow pins with tapered ends tightly fitted, respectively, in the frame eye and the spring eye, a pair of shackle links each provided with tapered sockets fitting over the corresponding tapered pin ends and affording swivels thereat, a bolt extending transversely between said links and drawing the same together and spring means tensioned by said bolt to tighten said swivel; a lubricating installation comprising a longitudinal bore through one of said links effecting communication between the two sockets thereof and notches at the inner ends of each of said sockets of said link and in communication with the bore through said link to convey lubricant from one of the hollow pins to the link bore and from the bore to the other of the hollow pins.

16. In combination with a tension shackle co-operating with a frame eye and spring eye and including a lower pin with tapered ends fixed in the frame eye, an upper pin with tapered ends fixed in the spring eye, links fitting with tapered bearing sockets on the ends of said pins and connecting the same and means tightening said tapered bearings; a lubricating installation comprising longitudinal ducts in said pins, means admitting lubricant to the duct in the lower pin through the frame eye, a passageway from said duct through one of said links to the duct in the upper pin and a filler core in said passageway for decreasing the effective volume thereof.

17. In combination with a tension shackle co-operating with a frame eye and a spring eye and including a hollow pin fixed in the lower frame eye and having tapering ends protruding laterally therebeyond, a hollow pin fixed in the upper spring eye and having tapering ends protruding therebeyond, links provided with corresponding tapered sockets having bearing mounts over the corresponding tapering pin ends and means tightening said sockets upon said tapering ends; a lubricating installation comprising a lubricant inlet at the lower frame eye feeding lubricant into the inside of the lower pin, a bore through one of the links for feeding lubricant upward from inside of the lower pin to inside of the upper pin, cores in said pins nearly closing openings therein to reduce the effective oil-containing volume thereof and another core nearly closing the bore of the link serving a similar purpose.

18. In combination with a tension shackle co-operating with a frame eye and a spring eye, the former eye being below the latter, and including a hollow pin in the frame eye with tapering ends therebeyond, a hollow pin in the spring eye with tapering ends therebeyond, and a pair of shackle links with tapered sockets fitted over the corresponding tapered ends of the frame and spring pins; a lubricating installation comprising means to admit lubricant to the inside of the lower pin, a rigid core nearly filling the space within said pin and affording a capillary passage thereabout, a bore longitudinally of one of said links for feeding lubricant from the inside of the lower pin to the inside of the upper pin, a core nearly filling said shackle link bore to form a capillary passage therethrough and means for making said tapered bearings substantially lubricant-tight.

19. The combination recited in claim 18 in which the core in the hollow pin is a hollow cylindrical shell having plugs closing the ends thereof.

20. In combination with a spring shackle co-operating with a frame eye and a spring eye including a pin fixed in the frame eye and protruding at its ends therebeyond, a pin fixed in the spring eye and protruding at its ends therebeyond, a pair of shackle links each provided with sockets fitting over the ends of the pins and affording a swivelling connection thereat and a bolt through the middle of said links drawing the sockets thereof tight upon the corresponding pin ends; a lubricating installation comprising a lubricant inlet at the frame, a port between the ends of the frame pin receiving lubricant therefrom, an axial bore in said pin receiving lubricant from said port, peripheral circular grooves about the ends of the frame pin receiving lubricant from said axial bore, and a longitudinal bore in one of said links substantially tangential to and communicating with said grooves, and thereby clearing said bolt, said longitudinal bore passing through said link from end to end thereof and being plugged at said ends between the ends of the link and the adjacent sides of the bolt.

21. In combination with a spring shackle co-operating with a spring eye and a frame eye and including a pin fixed in the frame eye and protruding at its ends therebeyond, another pin fixed in the spring eye and protruding at its ends therebeyond, a pair of shackle links each provided with sockets fitting over the ends of the pins and affording a swivelling connection thereat and a bolt through the middles of said links drawing the same together tight upon the corresponding pin ends; a lubricating installation comprising a lubricant inlet at the frame, a longitudinal bore in said frame pin, a port between the ends of the frame pin from the inlet to the bore, longitudinal grooves in the inner portions of said sockets, a longitudinal bore in one of said links, and means to maintain said swivels in lubricant tight condition and prevent substantial leak therefrom, said longitudinal bore passing through said link from end to end thereof and being plugged at said ends between the ends of the link and the adjacent sides of the bolt.

22. In combination with a structure having a fixed longitudinal conical bearing element, a moving conical socket bearing element receiving the end of said longitudinal bearing element and another bearing carried by said socket bearing element; a lubricating installation comprising an inlet to the fixed element, a bore through said fixed element to the bottom of the socket, a peripheral circular distributing groove around the socket substantially above the bottom thereof and in the bearing surface, longitudinal grooves in said socket between the bottom of the socket and the groove, said longitudinal grooves being of maximum cross sectional flow area adjacent the bottom of the socket and of minimum cross sectional flow area adjacent the outer end of the socket and a bore through said socket element to conduct lubricant to said other bearing.

FREDERIC C. BOOTH.